(12) United States Patent
Kakiuchi et al.

(10) Patent No.: US 7,561,791 B2
(45) Date of Patent: Jul. 14, 2009

(54) PHOTOGRAPHED BODY AUTHENTICATING DEVICE, FACE AUTHENTICATING DEVICE, PORTABLE TELEPHONE, PHOTOGRAPHED BODY AUTHENTICATING UNIT, PHOTOGRAPHED BODY AUTHENTICATING METHOD AND PHOTOGRAPHED BODY AUTHENTICATING PROGRAM

(75) Inventors: Takashi Kakiuchi, Kusatsu (JP); Tomohiro Inoue, Kusatsu (JP)

(73) Assignee: OMRON Corporation, Kyoto (JP)

( * ) Notice: Subject to any disclaimer, the term of this patent is extended or adjusted under 35 U.S.C. 154(b) by 441 days.

(21) Appl. No.: 11/374,371

(22) Filed: Mar. 13, 2006

(65) Prior Publication Data
US 2006/0210261 A1    Sep. 21, 2006

(30) Foreign Application Priority Data
Mar. 15, 2005    (JP)    ............... 2005-074034

(51) Int. Cl.
*G03B 15/03*    (2006.01)
*G03B 3/10*    (2006.01)
(52) U.S. Cl. ...................... 396/155; 396/123
(58) Field of Classification Search ................ 396/123, 396/155, 157, 166; 348/156, 161, 164, 239; 382/118
See application file for complete search history.

(56) References Cited

U.S. PATENT DOCUMENTS 7,106,902 B2 *    9/2006    Nakazawa et al. .......... 382/182

2002/0146169 A1    10/2002    Sukthankar et al.
2003/0174868 A1    9/2003    Adachi et al.
2004/0218070 A1    11/2004    Hamalainen

FOREIGN PATENT DOCUMENTS

JP    2004-362079    12/2004

OTHER PUBLICATIONS

Patent Abstracts of Japan, Publication No. 2004-362079, Publication Date: Dec. 24, 2004, 1 page.
Extended European Search Report dated Jul. 21, 2006; application No. 06111129.0 (6 pages).
Communication pursuant to Article 94(3) EPC issued in European Application No. EP 06 111 129.0 mailed on Feb. 11, 2008, 5 pages.

\* cited by examiner

*Primary Examiner*—Rodney E Fuller
(74) *Attorney, Agent, or Firm*—Osha · Liang LLP

(57) ABSTRACT

A photographed body authenticating unit includes a control unit for executing solid judgment processing for judging whether a photographed body is solid or not based on an entire brightness changing amount of an entirety of a photographed body and a partial brightness changing amount of a part of the photographed body. The entire and partial brightness changing amounts are acquired by a difference between photographed image data obtained in different illuminating states. The control unit also executes photographed body collation processing for collating whether the photographed body is already registered with respect to at least one photographing image or not and authentication processing for authenticating that the photographed body is true when the solid judgment processing determines that the photographed body is solid and the collation processing determines that the photographed body is already registered.

7 Claims, 7 Drawing Sheets

US 7,561,791 B2

PHOTOGRAPHED BODY AUTHENTICATING DEVICE, FACE AUTHENTICATING DEVICE, PORTABLE TELEPHONE, PHOTOGRAPHED BODY AUTHENTICATING UNIT, PHOTOGRAPHED BODY AUTHENTICATING METHOD AND PHOTOGRAPHED BODY AUTHENTICATING PROGRAM

BACKGROUND OF THE INVENTION

1. Technical Field

This invention relates to a photographed body authenticating device, a face authenticating device, a portable telephone, a photographed body authenticating unit, a photographed body authenticating method and a photographed body authenticating program for photographing a photographed body such as the face of a person, the iris, a palm print, etc. and authenticating the photographed body.

2. Background Art

Various kinds of authenticating systems such as a face authenticating system for photographing and authenticating the face, an iris authenticating system for photographing and authenticating the iris, a palm print authenticating system for photographing and authenticating the palm print of a hand, etc. are conventionally proposed as a system for authenticating the person in question.

In these authenticating systems, the photographed body such as a face, an eye or a hand is photographed and authenticated, but it is necessary to exclude a person disguising and setting up for the photographed body by a photograph, etc.

A personal authenticating device is proposed as a method for excluding this disguise using the photograph (see patent literature 1). In this device, the photographed body is photographed plural times, and it is judged that it is not the person in question if the background of each photographing image is not continuous.

However, when the disguise using the photograph is excluded by the continuation of the background, there is the following problem. Namely, for example, when it is considered that this device is mounted to a portable information terminal such as a portable telephone, a PDA, etc., the background within the photographing image is changed if it is intended to perform the authentication during a movement using a train, an automobile or walking, etc. Therefore, it is impossible to authenticate that it is the person in question.

Further, a problem exists in that the disguise is made if the photograph photographed in the same background is prepared.

[Patent literature 1] JP-A-2004-362079

SUMMARY OF THE INVENTION

In consideration of the above problem, an object of this invention is to provide a photographed body authenticating device, a face authenticating device, a portable telephone, a photographed body authenticating unit, a photographed body authenticating method and a photographed body authenticating program able to exclude the disguise using the photograph without causing any obstacle in performing the authentication by the person in question.

This invention resides in a photographed body authenticating method or a photographed body authenticating device using photographing means for photographing a photographed body, and authenticating the photographed body on the basis of a photographing image provided by photographing the photographed body by the photographing means;

the photographed body authenticating method or the photographed body authenticating device further using:

illuminating means for illuminating the photographed body; and control means for controlling the operations of the illuminating means and the photographing means;

wherein the control means is constructed so as to execute:

plural times photographing processing for differently setting illuminating states using the illuminating means, and executing the photographings of plural times by the photographing means;

solid judgment processing for acquiring the difference in brightness between the photographing images with respect to each of plural areas set in advance, and comparing the acquired plural brightness differences, and judging whether the photographed body is solid or not;

photographed body collation processing for collating whether it is the photographed body already registered with respect to at least one photographing image or not; and authentication processing for authenticating that the photographed body is true when it is judged by the solid judgment processing that the photographed body is solid, and it is judged by the photographed body collation processing that it is the photographed body already registered.

Thus, the disguise using a planar photograph can be appropriately excluded. In particular, since the background of the photographed body is not set to an authenticating condition, appropriate authentication can be performed irrespective of the existence of a background change.

Further, the above plural times photographing processing can be constructed so as to be continuously executed at a time interval determined in advance as a mode of this invention.

Thus, the operating burden of a user can be reduced. Further, the photographing can be performed without being conscious of the photographings of plural times by the user. In particular, when the time interval for performing the continuous photographing is set to a time interval of a degree unable to substitute the photograph by a person in front of the photographing means, it is possible to prevent the disguise that plural photographs having brightness differences prepared in advance are substituted.

Further, this invention can be also set to a face authenticating device having the above photographed body authenticating device and constructed so as to photograph a face as the photographed body by the above photographing means.

Thus, a mental resistance feeling is small in comparison with a palm print, the iris, etc. Further, it is possible to appropriately exclude the disguise using the photograph by face authentication easily accepted from a custom such as a nodding acquaintanceship, a face pass, etc.

Further, this invention can be also set to a portable telephone having the above photographed body authenticating device.

Thus, unfair utilization of the portable telephone can be prevented.

This invention can be also set to a photographed body authenticating unit or a photographed body authenticating program comprising control means for executing:

solid judgment processing for acquiring the difference in brightness between plural photographing images having different illuminating states with respect to each of plural areas set in advance, and comparing the acquired plural brightness differences, and judging whether the photographed body within the photographing image is solid or not;

photographed body collation processing for collating whether it is the photographed body already registered with respect to at least one photographing image or not; and authentication processing for authenticating that the photographed body is true when it is judged by the solid judgment processing that the photographed body is solid, and it is judged by the photographed body collation processing that it is the photographed body already registered.

Thus, the photographed body authenticating unit is mounted to a suitable device, or the photographed body authenticating program is installed so that the photographed body can be authenticated by this device. Further, the disguise using a planar photograph can be appropriately excluded. In particular, since the background of the photographed body is not set to an authenticating condition, appropriate authentication can be performed irrespective of the existence of a background change.

The disguise using the photograph can be excluded by this invention without causing any obstacle in performing the authentication by the person in question.

DESCRIPTION OF THE PREFERRED EMBODIMENTS

One embodiment mode of this invention will next be explained together with the drawings.

Embodiment 1

Figure 1:
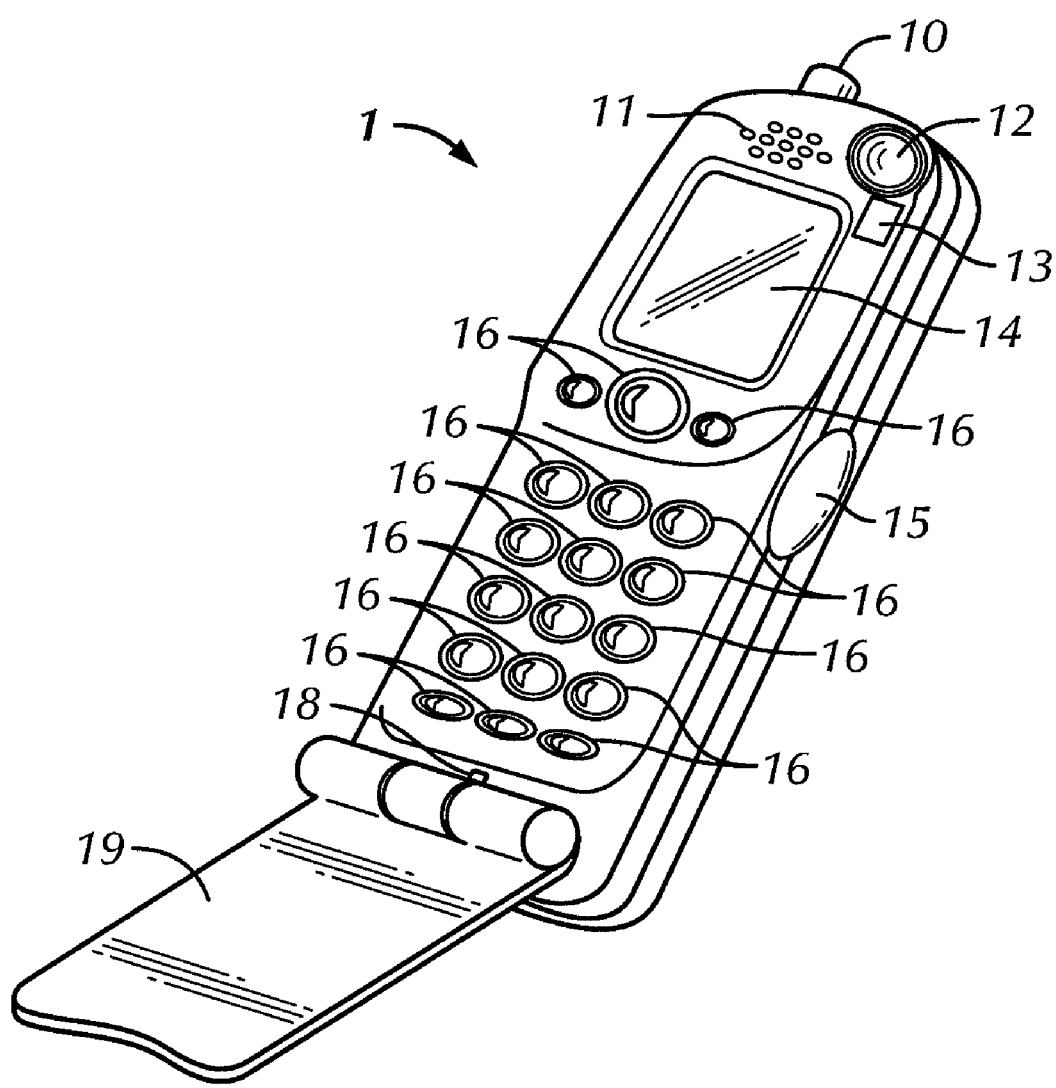
FIG. 1 is a perspective view of a photographed body authenticating device.

First, the construction of a photographed body authenticating device 1 will be explained together with the perspective view of the photographed body authenticating device 1 shown in FIG. 1.

The photographed body authenticating device 1 is constructed by a portable telephone as one kind of a portable information terminal. A speaker 11 for output a voice, a liquid crystal monitor 14 for displaying an image, plural operation buttons 16 for inputting operations, and a microphone 18 for inputting the voice are sequentially arranged from above on the front face of the photographed body authenticating device 1.

A camera 12 and an illuminating device 13 for photographing are vertically arranged proximately on the right-hand transversal side of the above speaker 11. A shutter button 15 of the camera 12 is arranged on the right-hand side face of the photographed body authenticating device 1.

An opening-closing cover 19 rotated forward and backward is pivotally mounted to the lower portion of the front face of the photographed body authenticating device 1. The opening-closing cover 19 is constructed so as to cover and protect the plural operation buttons 16 in a closing state. An antenna 10 for wireless communication is arranged in the upper portion of the rear face of the photographed body authenticating device 1. A controller constructed by a CPU and a memory section (ROM, RAM, etc.) and a battery charger are arranged within the photographed body authenticating device 1.

In accordance with the above construction, the operation button 16 is operated and electricity is supplied (a signal is transmitted) from the photographed body authenticating device 1. Further, the photographed body authenticating device 1 can receive an arriving signal by operating the operation button 16. Thus, voice telephonic communication with a telephone set of a remote place can be allowed. Further, it is possible to display contents by Internet connection and transmit and receive an electronic mail by operating the operation button 16. The photographing of a static image and a dynamic image using the camera 12 can be executed by pushing-down the shutter button 15. Thus, a photographing image can be displayed in the liquid crystal monitor 14.

Figure 2:
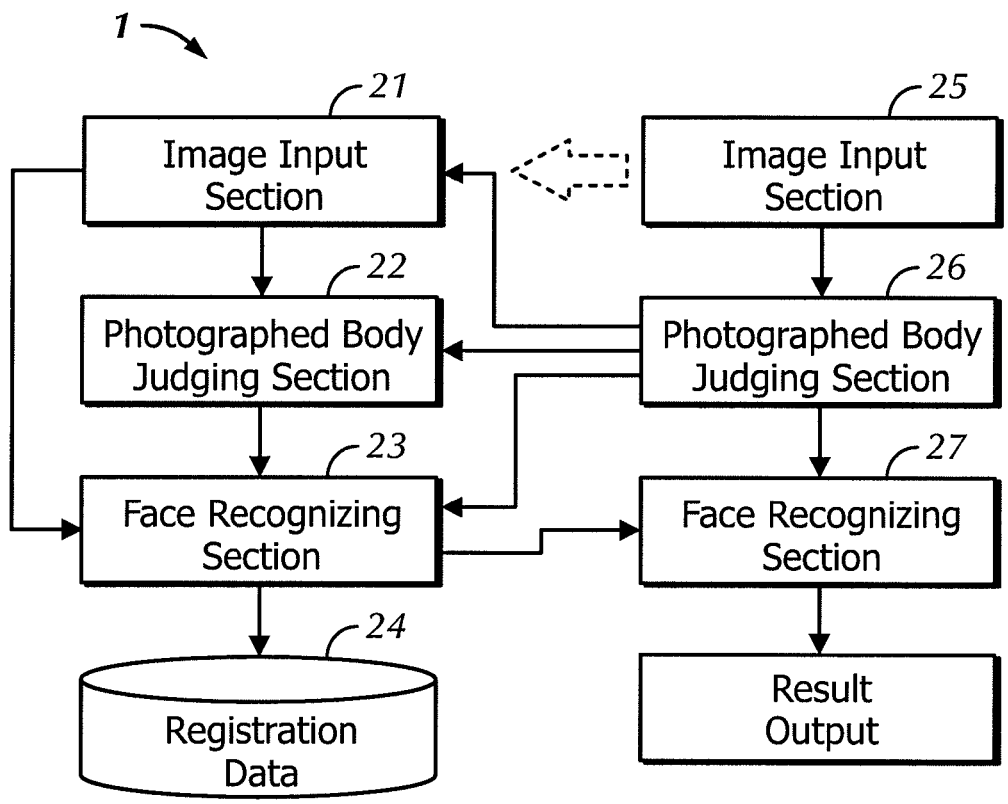
FIG. 2 is a block diagram showing the construction of the photographed body authenticating device.

Next, the construction of the photographed body authenticating device 1 will be explained together with the block diagram of the photographed body authenticating device 1 shown in FIG. 2. In this explanation, elements relating to a photographing function and an authenticating function required in personal authentication will be explained, and the explanations of the other elements are omitted.

The photographed body authenticating device 1 is constructed by an image input section 21, a photographed body judging section 22, a face recognizing section 23, registration data (dictionary data) 24, an illuminating section 25, a control section 26 and an authenticating result output section 27.

The above image input section 21 is constructed by the above camera 12 (FIG. 1), and transmits photographing image data obtained by photographing a photographed body by the above camera 12 to the photographed body judging section 22 and the face recognizing section 23 in accordance with control of the control section 26.

The above photographed body judging section 22 is arranged within a controller within the photographed body authenticating device 1, and judges whether the photographed body imaged by the photographing image data is solid or not, and transmits the judging result to the face recognizing section 23 in accordance with the control of the control section 26.

The above face recognizing section 23 is arranged within the controller within the photographed body authenticating device 1, and compares the photographing image data obtained from the image input section 21 and the registration data 24 read out of a memory section, and performs face collation as one kind of living body authentication in accordance with the control of the control section 26.

The above registration data 24 are data stored to the memory section, and are also the photographing image data of a user registered in advance. These photographing image data are preferably constructed by the image of a solid portion of a person such as a face image, an iris image or a palm print image, etc. able to be personally authenticated. In this embodiment mode, the face image having no mental resistance in the user is used. The registration data 24 are not limited to the image data, but may be also constructed by characteristic data provided by extracting a characteristic point and a characteristic amount from these image data.

The above illuminating section 25 is constructed by the above illuminating device 13 (FIG. 1), and executes irradiation of illumination used in photographing in accordance with the control of the control section 26. The illuminating device 13 is preferably constructed by a suitable illuminating device such as a flash illuminating device for emitting flashing light, or a lighting illuminating device (e.g., a LED and a fluorescent lamp) lighted, etc.

The above control section 26 is arranged within the controller within the photographed body authenticating device 1, and transmits a control signal to each element in accordance with data and a program stored to the memory section, and performs operation control. The program stored to the memory section includes a photographed body authenticating program for authenticating the photographed body by the photographing image.

Further, the control section 26 performs the personal authentication on the basis of the judgment as to whether it is solid or not by using the above photographed body judging section 22, and a collation result of the face collation using the above face recognizing section 23.

The above authenticating result output section 27 is constructed by the above liquid crystal monitor 14, and outputs an authenticating result acquired from the above face recognizing section 23 in accordance with the control of the control section 26. The authenticating result output section 27 is not limited to the liquid crystal monitor 14, but may be also constructed by another element such as a communicating section for transmitting the authenticating result in e.g., the Internet communication, the control section 26 for controlling whether a portable telephone is operated or not after the authentication, etc. In this case, the authenticating result output section 27 can be set such that no user is conscious of the authenticating operation by controlling the operation of the portable telephone by the output of authenticating result information, and displaying no authenticating result in the liquid crystal monitor 14.

In accordance with the above construction, an illuminating environment is prepared by the illuminating device 13 of the photographed body authenticating device 1, and the photographing operation is performed by the camera 12 in this illuminating environment. The personal authentication is performed from the photographed photographing image, and the authenticating result can be outputted (displayed by the liquid crystal monitor 14).

Figure 3:
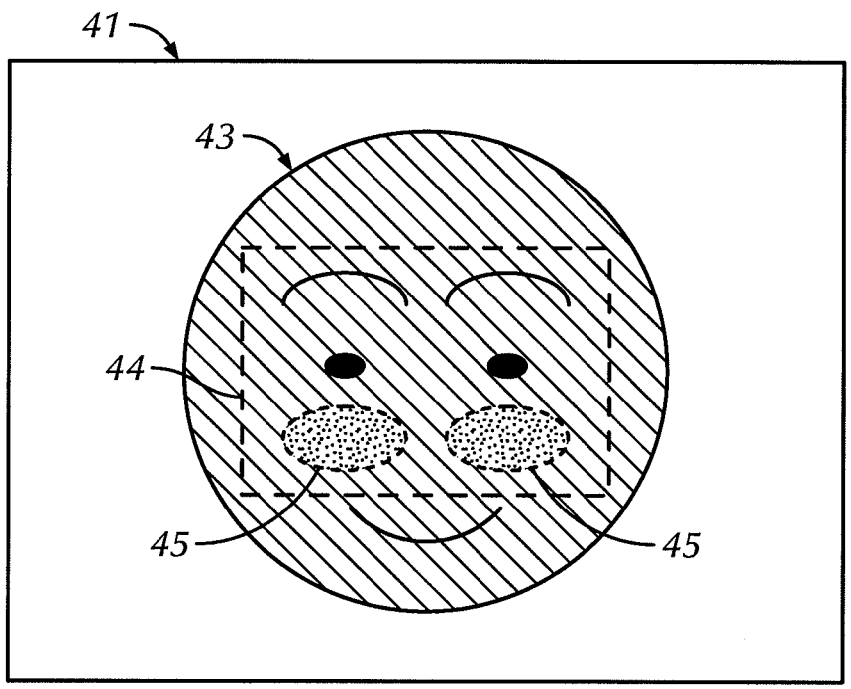
FIG. 3 is an area explanatory view for explaining various kinds of areas of a photographing image.

Next, various kinds of areas used in the judgment as to whether it is solid or not with respect to the photographed photographing image will be explained together with the area explanatory view shown in FIG. 3.

The photographing image 41 includes a face image 43 of the user as the photographed body. With respect to this face image 43, a central portion as representation of the entire face is set to an entire face brightness area 44 and an area near a cheek is set to a cheek brightness area 45.

Thus, when the photographing operation is performed by differently setting illuminating conditions, it is possible to compare a brightness difference of the entire face in each illuminating condition, and a brightness difference of a cheek portion generally convexly formed. The entire face brightness area 44 is not limited to the area of the illustrated central portion, but may be also set to about the entire face.

Figure 4:
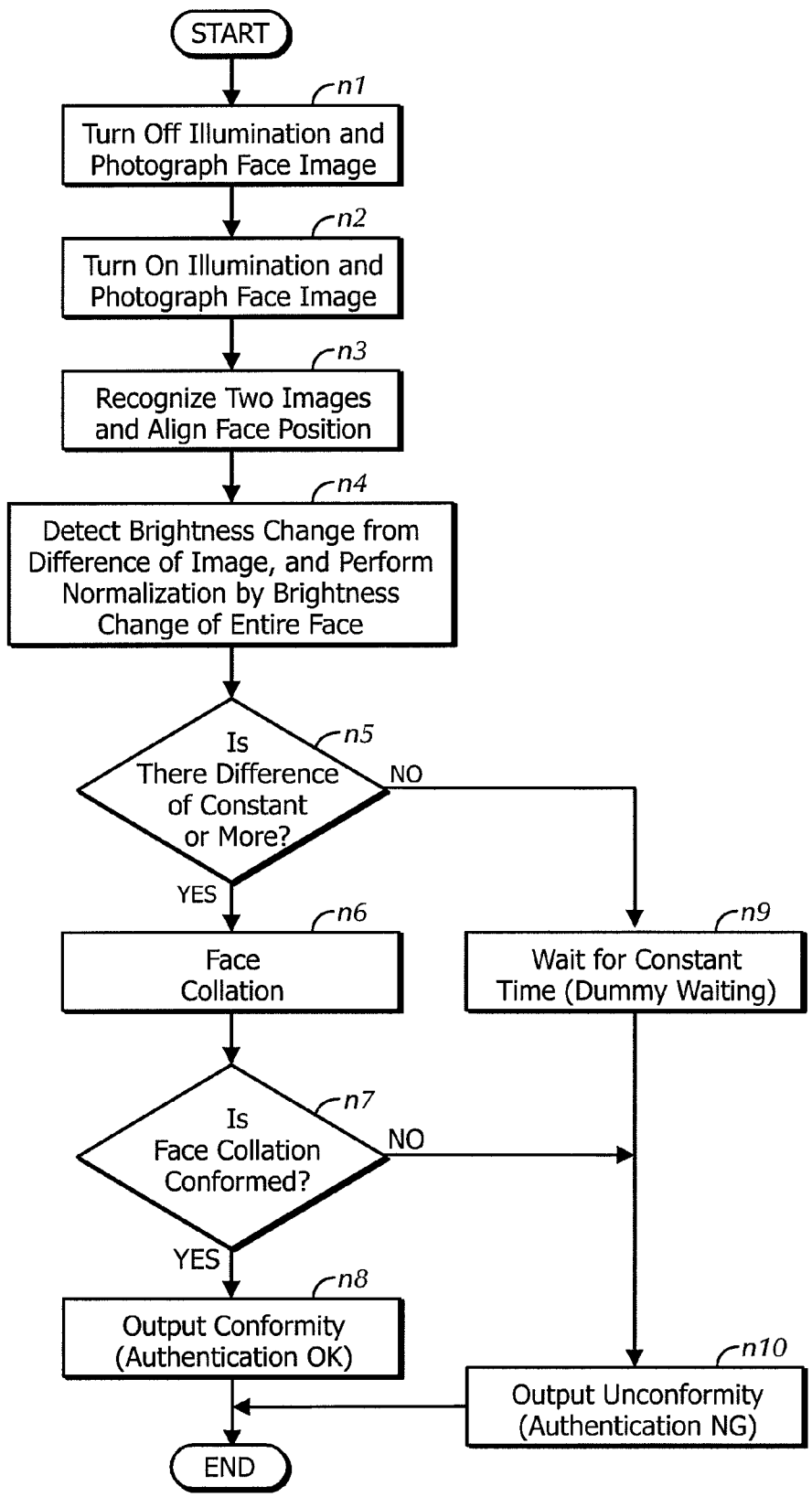
FIG. 4 is a flow chart showing an operation executed by a control section.

Next, an operation executed by the control section 26 in accordance with a photographed body authenticating program will be explained together with the flow chart showing the operation executed by the control section 26 shown in FIG. 4.

The control section 26 turns off the illumination of the illuminating device 13', and executes the photographing of the face of the photographed body, and acquires face image data without illumination (step n1).

Next, the control section 26 turns on the illumination of the illuminating device 13, and executes the photographing of the face of the photographed body, and acquires face image data with illumination (step n2). A time interval determined in advance is set between these steps n1 and n2. The time interval is set to a short time interval of a degree unable to substitute the photograph in front of the camera 12 (or a degree difficult to substitute the photograph) during this time interval. Thus, the control section 26 is set such that the photographing operation is continuously performed twice for a short time.

The control section 26 sends the acquired face image data without illumination and face image data with illumination to the photographed body judging section 22. The photographed body judging section 22 recognizes a face position with respect to each face image data, and executes processing for aligning the mutual face position (step n3). For example, this recognition of the face position can be executed by detecting a rough contour of the face, and setting a graph of a small node number to a base, and applying the graphs of various sizes to the entire image.

The photographed body judging section 22 then detects a brightness changing amount of the entire face, i.e., an entire changing amount, and a brightness changing amount of the cheek portion, i.e., a partial changing amount from a difference of the image aligned in the face position, and performs normalization by the brightness changing amount of the entire face (step n4). At this time, the entire changing amount is calculated by the brightness changing amount of the above entire face brightness area 44 (FIG. 3), and the partial changing amount is calculated by the brightness changing amount of the above cheek brightness area 45 (FIG. 3).

Figure 5A:
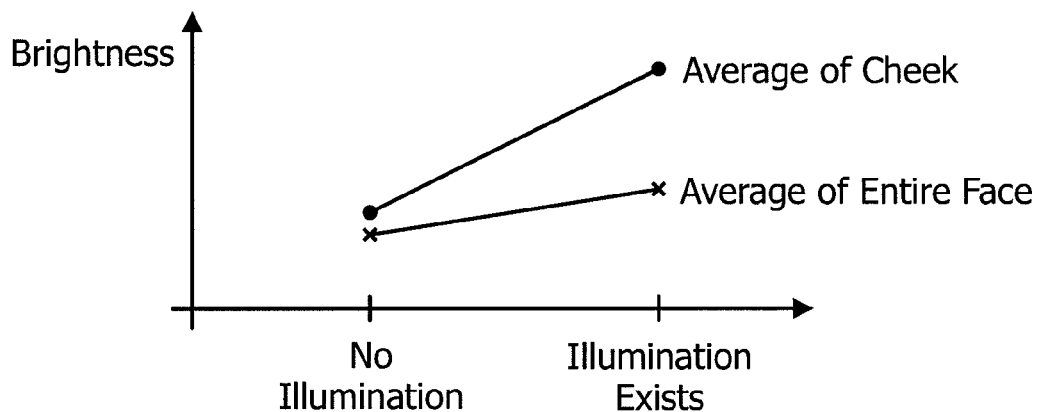
FIGS. 5A and 5B are graphs showing brightness changes.

These entire changing amount and partial changing amount will be described in detail. When the face of a user as the photographed body is actually photographed, as shown in the graph of FIG. 5A, the changing amount (partial changing amount) of an average of the cheek becomes larger than the changing amount (entire changing amount) of an average of the entire face as a brightness change of the nonexistence and existence of illumination.

Figure 7A:
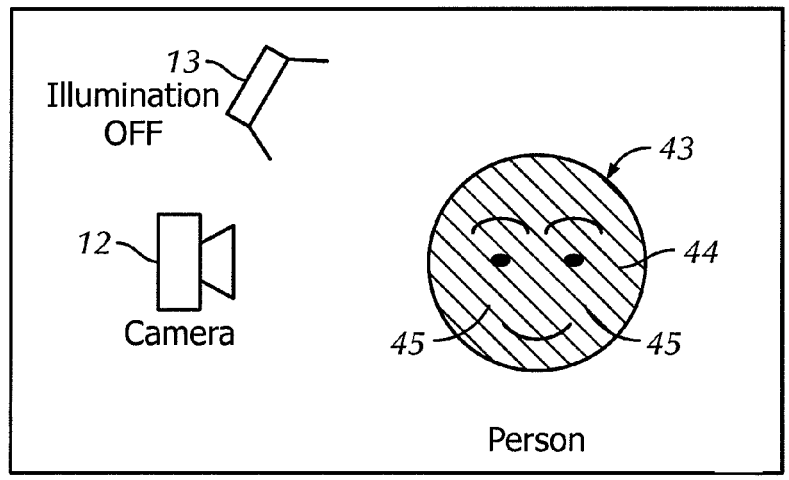
FIGS. 7A, 7B and 7C are explanatory views for explaining illumination effects.
Figure 7B:
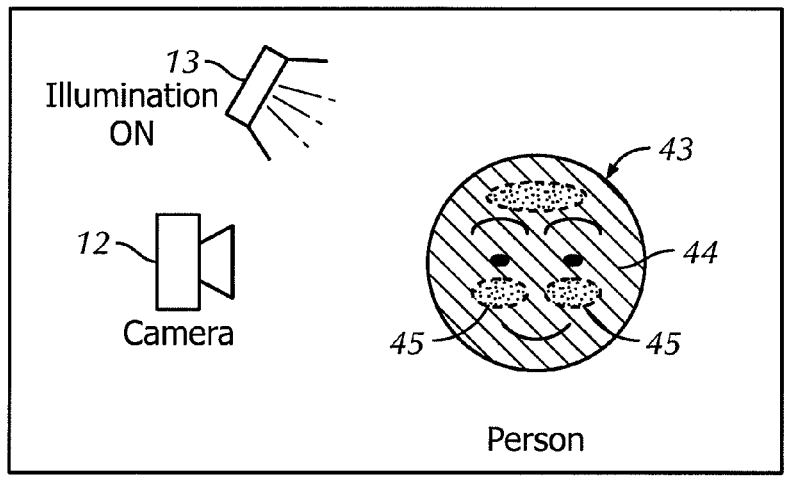

This is because a difference is caused in contrast in accordance with the difference in the illuminating environment since the face is an irregular solid object. Namely, as shown in the explanatory view of the illuminating effect of FIG. 7A, when the photographing operation is performed without illumination, the contrast of the entire face is weakened. However, when the photographing operation with illumination is performed as shown in the explanatory view of the illuminating effect of FIG. 7B, the contrast of the entire face is raised and a convex portion such as the cheek, the nose and the forehead is projected from the other concave portions and becomes light. Accordingly, the brightness changing amount of the cheek portion (cheek brightness area 45) becomes larger than the brightness changing amount of the entire face (entire face brightness area 44).

Figure 5B:
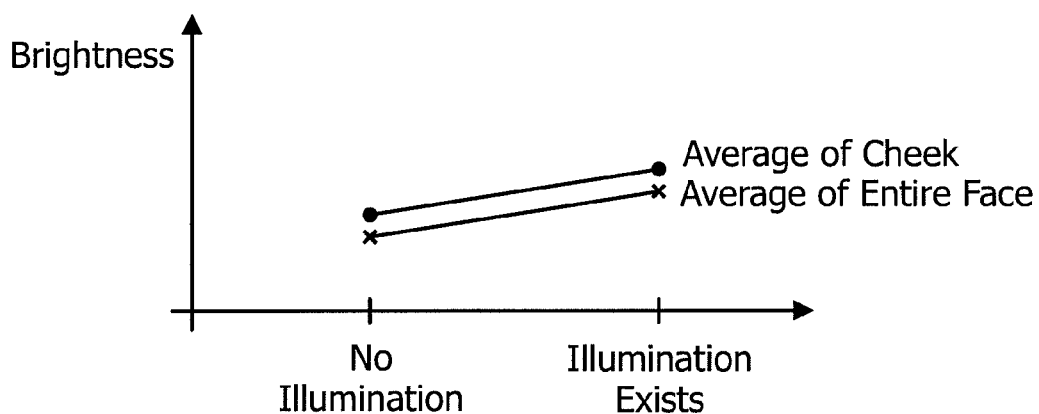
Figure 7C:
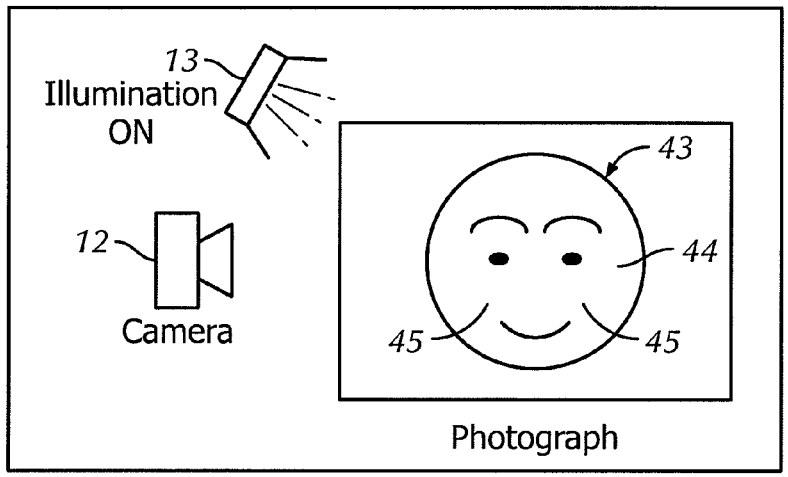

In contrast to this, when the photographed body is a photograph, as shown in the graph of FIG. 5B, the changing amount (partial changing amount) of the average of the cheek, and the changing amount (entire changing amount) of the average of the entire face are not almost changed. The reasons for this are as follows. Namely, as shown in the explanatory view of the illuminating effect of FIG. 7C, even when the illuminating environment is changed, the photograph as a plane merely entirely becomes light or dark. Accordingly, no change almost appears in contrast. Therefore, the brightness changing amount of the entire face (entire face brightness area 44) and the brightness changing amount of the cheek portion (cheek brightness area 45) are not almost changed.

Figure 6A:
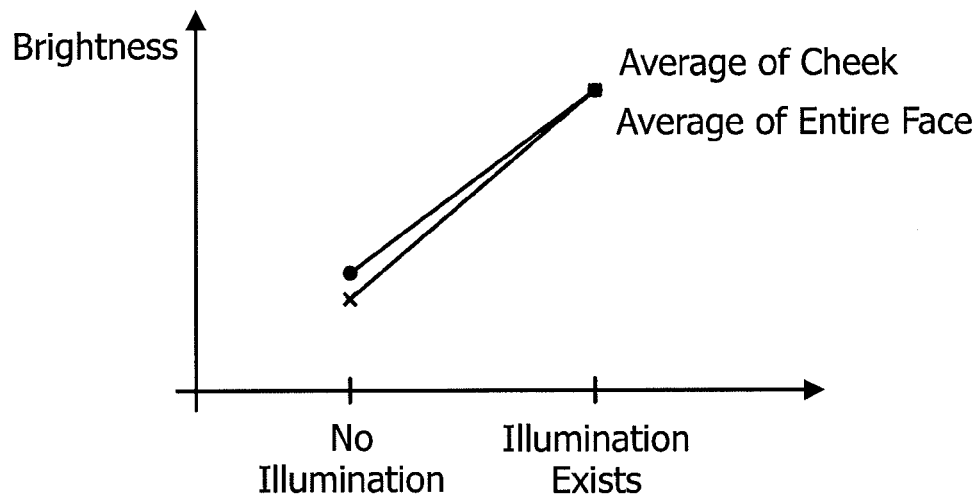
FIGS. 6A and 6B are graphs showing brightness changes.
Figure 6B:
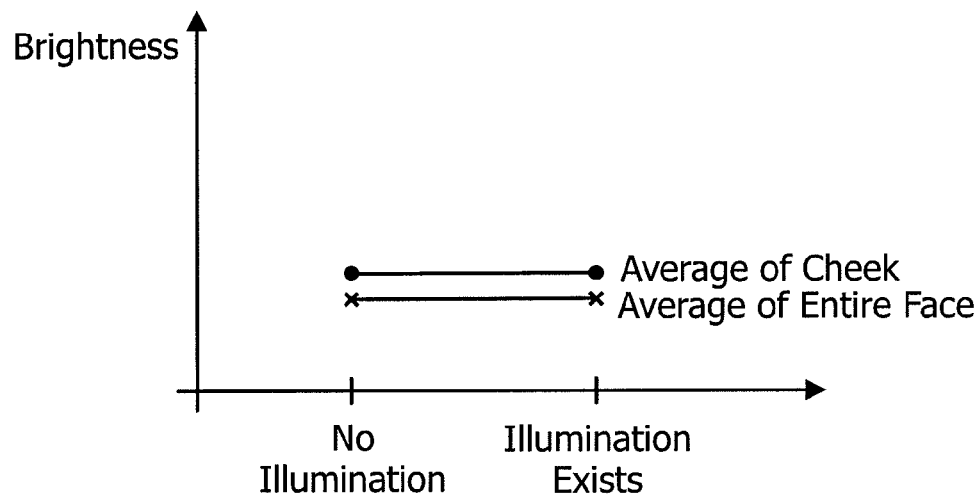

With respect to the brightness change of the photograph, when white stepping is caused by the illumination as shown in FIG. 6A, there is a case in which the entire changing amount reversely becomes larger than the partial changing amount. When the photograph is inclined as shown in FIG. 6B, there is a case in which there is no influence on brightness at all even when the illuminating environment is different.

With respect to such partial changing amount and entire changing amount, the photographed body judging section 22 judges whether or not the above partial changing amount is larger than the above entire changing amount by a constant or more (i.e., an allowing range or more using a threshold value determined in advance) (step n5). The photographed body judging section 22 then sends a judging result to the control section 26.

When the partial changing amount is larger than the entire changing amount by a constant or more (step n5: Yes), the control section 26 judges that it is solid, and executes the face collation by the face recognizing section 23 (step n6). In this face collation, face image data preferable in the illuminating environment among the face image data without illumination and the face image data with illumination, e.g., the face image data with illumination are compared with the registration data 24 and the face collation is performed. It may be also determined in advance whether the face collation is performed by using which face image data.

In the comparison of the face image data and the registration data 24, a characteristic amount proper to the person in question is calculated from the face image data with illumination, and is compared (collated) with a characteristic amount of the registration data 24. If the difference in the characteristic amount lies within a constant threshold value determined in advance, it is judged that it is the same person.

For example, the characteristic amount proper to the above person in question can be calculated by using Gabor wavelet transformation with respect to a characteristic point acquired from the face image data. This characteristic point can be acquired by cutting-out a face portion from a rough position of the face and normalizing the size of the face and further applying a detailed graph and detecting the position of the characteristic point of the face in detail. The Gabor wavelet transformation is a technique used in signal analysis and image compression. In this technique, a wavelet waveform is utilized from a transformation object, and only a character (a frequency component, etc.) provided by this waveform is taken out.

If the result of the face collation received from the face recognizing section 23 is conformed (step n7: Yes), the control section 26 outputs information of conformity (authentication OK) as a personal authenticating result (step n8).

When a value provided by subtracting the entire changing amount from the partial changing amount in the above step n5 is less than a constant value, it is judged that it is disguised (step n5: No). The control section 26 then waits for a standby time of the same degree as the execution of the above steps n6 to n7 (step n9). This standby time is a time set such that no unfair user can see through by a processing time whether it is unconformity since the disguise is known in the disguising case using the photograph, etc., or it is unconformity since no face collation is well performed.

After this step n9, when the result of the face collation is unconformity in the above step n7 (step n7: No), the control section 26 outputs information of the unconformity (authentication NG) as an authenticating result (step n10), and the processing is terminated.

On the basis of the authenticating result information showing these conformity/unconformity, the control section 26 displays the result in the liquid crystal monitor 14, and performs functional control as to whether an operation is performed or not in the shutter button 15 and the operation button 16, etc.

The personal authentication can be performed by the above operation on the basis of the face image data provided by photographing the face of a user. When the photograph is held up in front of the camera 12 and the disguise is intended in this personal authentication, it can be judged in step n5 that the photographed body is not solid, i.e., that it is no normal image data. Thus, the disguise using the photograph can be excluded.

This personal authentication is performed irrespective of the background of the photographing image. Therefore, it is possible to correctly authenticate that it is the person in question even during a movement.

Further, subsequently to first photographing without illumination, second photographing with illumination is automatically performed. Accordingly, even when the user feels photographing termination by turning-on of the illumination, two face image data can be already reliably acquired at that time point.

Further, in the first photographing without illumination, it is preferable to set a construction in which display of the contents of being photographed, a shutter sound, etc. are not generated. Thus, it is possible to set a construction in which no user can notice the photographings of plural times and can know the mechanism of processing of the photographed body judgment.

Further, when a flash illuminating device is used in the illuminating device 13, a time interval of continuous photographing can be set without having any influence on a strobo charging time for a flash by combining the photographing without illumination and the photographing with illumination.

Further, as already described, the disguise using the photograph can be discriminated by making the solid judgment on the basis of the degree of the brightness change in the present invention. However, it is also considered to make a further disguise plan in which a person knowing this mechanism of the photographed body judgment prepares two photographs of different brightnesses in advance by the photographing with illumination and the photographing without illumination, etc., and substitutes the photographs during the photographings of twice.

However, the time interval of the photographings of twice is shortly set. Therefore, this disguise can be excluded even when the person intending to perform the disguise plans the disguise by substituting the two photographs of different illuminating states in conformity with the respective photographing timings as mentioned above.

Further, in this embodiment mode, when it is judged as a solid in the photographed body judgment processing, the face collation requiring a longest processing time and having a complicated algorithm is performed only once. Therefore, the authentication processing can be completed at high speed. Further, when it is judged in the step n5 that it is not solid, no face collation is executed. Even when it is judged as a solid, the face collation is performed only once. Thus, electric power consumption of a battery (battery charger) of a portable telephone can be restrained at its minimum.

The judgment as to whether the photographed body is a solid or not can be processed and completed at a speed higher than that of the judgment as to whether it is the person in question or not by collating the face from the photographing image. Therefore, the authenticating result can be outputted at a speed higher than that of a case in which plural photographing images of different illuminating environments are respectively face-collated.

Further, the camera 12 and the illuminating device 13 are proximately arranged. Therefore, the position relation of the camera 12 and the illuminating device 13 is set on about the same optical axis. Thus, a preferable brightness change can be obtained by obtaining regular reflection of the illumination from the face of the user.

The photographing direction of the camera 12 and the display direction of the liquid crystal monitor 14 are constructed so as to be directed in the same direction. Therefore, a user imaged in the camera 12 before the photographing can be preview-displayed by the liquid crystal monitor 14. Thus, the user can confirm a photographing range and can take the photograph so that a preferable face image can be obtained.

The number of photographing times is set to two, but may be also set to a plural number.

Further, the photographings of plural times are performed with respect to the existence of illumination and the nonexistence of illumination, but may be also performed by changing the intensity of the illumination. In this case, it is also possible to judge whether it is a solid object or not by the brightness change and the change of contrast, and the disguise using the photograph can be excluded.

Further, the photographing may be also set such that the user is conscious of the photographing as a construction for executing the photographing in timing for performing an operation for authentication by the user as an authenticating mode. Further, the photographing may be also set such that no user is conscious of the photographing as a construction for executing the photographing in suitable timing on the device (portable telephone, etc.) side. Further, the photographing may be also set to a construction for performing the photographing without any consciousness of the user at a starting time point of a certain functional operation of the user.

The illuminating device 13 may be also arranged in a position separated from the camera 12 instead of the vicinity of the camera 12. For example, the illuminating device 13 may be also set to a construction in which the face of the user is illuminated from the transversal direction in a state photographed from the front face. In this case, it is also possible to judge whether it is a solid object or not by the brightness change due to an illumination change and the change of contrast, and the disguise using the photograph can be excluded.

The illuminating device 13 may be also constructed by plural illuminating devices of different illuminations, and may be also set to a construction for switching the illuminating devices for performing illumination and changing an illuminating environment and performing the photographings of plural times. In this case, as the construction for differently setting the illuminations, it is possible to set a construction for differently setting the kind of the illuminating device, the illuminating strength of the illuminating device, the position of the illuminating device, the illuminating direction or plural ones thereof. In this case, plural photographing images of different illuminating environments can be also acquired.

The photographed body authenticating device 1 is constructed by suitably arranging each constructional element such as the camera 12, the illuminating device 13 and liquid crystal monitor 14 in a suitable place such as an inlet and an outlet of equipment and a ticket examination passage within a station yard as well as a portable telephone, and may be also used in authentication for managing an entering-retreating room and authentication for a financial device such as an ATM, etc. In this case, the disguise using the photograph can be also excluded and the personal authentication can be performed, and the photographed body authenticating device 1 can be utilized in various places and uses.

It may be also set to a construction in which no image photographed in the camera 12 is displayed in the liquid crystal monitor 14 before the photographing for authentication. In this case, no user can confirm a photographing range before the photographing. However, the length of a hand of the user is determined to a certain extent particularly in a portable telephone. Accordingly, the face image can be mostly acquired without any problem. The photograph is generally smaller than the real face size. Accordingly, no person intending to perform the disguise using the photograph can know whether the photographing is performed at a moderate size if the photographing is performed by setting the distance of the camera 12 and the photograph to a which extent. Thus, the disguise using the photograph can be set to be further difficult.

Embodiment 2

Figure 8:
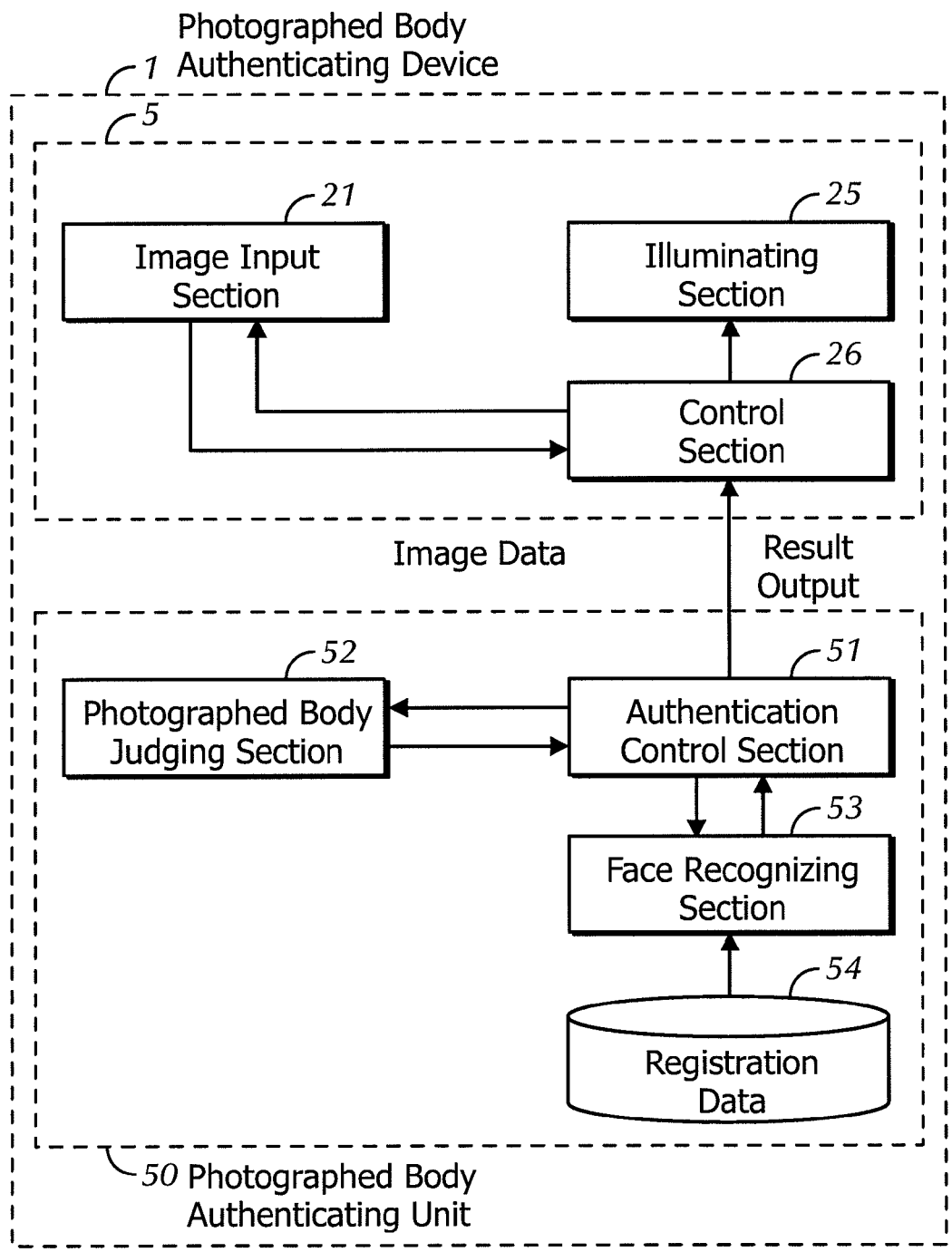
FIG. 8 is a block diagram showing the construction of a photographed body authenticating device of a second embodiment.

A photographed body authenticating device 1 of a second embodiment will next be explained together with the block diagram shown in FIG. 8.

This photographed body authenticating device 1 is constructed by mounting a photographed body authenticating unit 50 to a portable telephone.

An image input section 21, an illuminating section 25 and a control section 26 are arranged in the photographed body authenticating device 1. Each of these elements is the same as the above embodiment 1 except that the output destination of photographing image data using the image input section 21 is set to the control section 26, and its detailed explanation is therefore omitted. A photographing unit 5 for executing photographing processing is constructed by the image input section 21, the illuminating section 25 and the control section 26.

In the photographed body authenticating device 1, the photographed body authenticating unit 50 is electrically connected to a suitable input-output section and is arranged. In this photographed body authenticating unit 50, an unillustrated controller constructed by a CPU and a memory section (ROM, RAM, etc.) is arranged. The interior of this controller is constructed by an authentication control section 51, a photographed body judging section 52, a face recognizing section 53 and registration data 54.

The above authentication control section 51 executes various kinds of control operations in accordance with data and a program stored to the memory section. The program stored to the memory section includes a photographed body authenticating program for authenticating the photographed body by the photographing image.

The personal authentication is performed on the basis of the judgment as to whether it is solid or not using the photographed body judging section 52, and a collating result of the face collation using the face recognizing section 53. An authenticating result of this personal authentication is transmitted to the control section 26 of the photographed body authenticating device 1.

The above photographed body judging section 52 judges whether the photographed body imaged by photographing image data is solid or not in accordance with control of the authentication control section 51, and transmits a judging result to the authentication control section 51.

The above face recognizing section 53 compares the photographing image data obtained from the authentication control section 51 and registration data 54 read out of the memory section in accordance with the control of the authentication control section 51, and performs the face collation as one kind of living body authentication.

The above registration data 54 are data stored to the memory section, and are also the photographing image data of a user registered in advance. These photographing image data are preferably constructed by the image of a solid portion of a person such as a face image, an iris image, or a palm print image, etc. able to perform the personal authentication. In this embodiment mode, the face image having no mental resistance with respect to the user is used. The registration data 54 are not limited to the image data, but may be also constructed by characteristic data in which a characteristic point and a characteristic amount are extracted from these image data.

In accordance with the above construction, the photographed body authenticating unit 50 is mounted to a device such as a portable telephone, etc., and the photographed body authentication can be executed. Thus, the same operation and effect as embodiment 1 are obtained.

The photographed body authenticating device 1 of embodiment 2 constructed in this way performs about the same operation as embodiment 1. Namely, the control section 26 executes the operations of steps n1 to n2 shown in FIG. 4. The control section 26 transmits the photographing image data to the authentication control section 51 during the time from step n2 to step n3. The authentication control section 51 executes operations executed by the control section 26 in steps n3 to n10. At this time, the photographed body judging section 52 executes the operation of the photographed body judging section 22 of embodiment 1, and the face recognizing section 53 executes the operation of the face recognizing section 23 of embodiment 1. The same data as the registration data 24 are stored to the registration data 54.

The same operation and effect as embodiment 1 can be obtained by the above operation. The photographed body authenticating unit 50 is a part having the input-output section. Therefore, the photographed body authenticating unit 50 can be mounted to various kinds of devices. Thus, the photographed body authentication difficult to perform the disguise can be mounted to various devices.

In the second embodiment, the registration data are stored into the photographed body authenticating unit 50, but may be also stored into the memory section of the photographing unit 5 side.

The correspondence of the construction of this invention and the above embodiment modes will be described.

The face authenticating device and the portable telephone of this invention correspond to the photographed body authenticating device 1 of the embodiment modes.

Similarly, the photographing means corresponds to the camera 12 and the image input section 21.

The illuminating means corresponds to the illuminating device 13 and the illuminating section 25.

The control means corresponds to the controller, the photographed body judging section 22 and the face recognizing section 23 and the control section 26, and the authentication control section 51 and the photographed body judging section 52 and the face recognizing section 53.

The plural times photographing processing corresponds to steps n1 to n2.

The authentication processing corresponds to step n8.

The solid judgment processing corresponds to steps n3 to n5.

The photographed body collation processing corresponds to steps n6 to n7.

The time interval determined in advance corresponds to a short time of a degree unable to substitute the photograph (or a degree difficult to substitute) in front of the camera 12.

The photographed body corresponds to the face of a user.

However, this invention is not limited to only the constructions of the above embodiment modes, but many embodiment modes can be obtained.

What is claimed is:

1. A photographed body authenticating device comprising photographing means for photographing a photographed body, and authenticating the photographed body based on a photographic image provided by photographing the photographed body by the photographing means;

the photographed body authenticating device further comprising:

illuminating means for illuminating said photographed body; and control means for controlling the operations of the illuminating means and said photographing means;

wherein the control means is constructed so as to execute:

plural times photographing processing for differently setting illuminating states using said illuminating means, and executing a plurality of photographings by said photographing means;

solid judgment processing for judging whether the photographed body is solid or not based on an entire brightness changing amount of an entirety of the photographed body and a partial brightness changing amount of a part of the photographed body, wherein the entire and partial brightness changing amounts are acquired by a difference between photographed image data obtained in different illuminating states;

photographed body collation processing for collating whether it is the photographed body already registered with respect to at least one photographing image or not; and authentication processing for authenticating that the photographed body is true when it is judged by said solid judgment processing that the photographed body is solid, and it is judged by said photographed body collation processing that it is the photographed body already registered.

2. The photographed body authenticating device according to claim 1, wherein said plural times photographing processing is constructed so as to be continuously executed at a time interval determined in advance.

3. The photographed body authenticating device according to claim 1, wherein the photographed body is a face.

4. A portable telephone comprising:

photographing means for photographing a photographed body, and authenticating the photographed body based on a photographic image provided by photographing the photographed body by the photographing means;

the photographed body authenticating device further comprising:

illuminating means for illuminating said photographed body; and control means for controlling the operations of the illuminating means and said photographing means;

wherein the control means is constructed so as to execute:

plural times photographing processing for differently setting illuminating states using said illuminating means, and executing a plurality of photographings by said photographing means;

solid judgment processing for judging whether the photographed body is solid or not based on an entire brightness changing amount of an entirety of the photographed body and a partial brightness changing amount of a part of the photographed body, wherein the entire and the partial brightness changing amounts are acquired by a difference between photographed image data obtained in different illuminating states;

photographed body collation processing for collating whether it is the photographed body already registered with respect to at least one photographing image or not; and authentication processing for authenticating that the photographed body is true when it is judged by said solid judgment processing that the photographed body is solid, and it is judged by said photographed body collation processing that it is the photographed body already registered.

5. A photographed body authenticating unit comprising control means for executing:

solid judgment processing for judging whether a photographed body is solid or not based on an entire brightness changing amount of an entirety of the photographed body and a partial brightness changing amount of a part of the photographed body, wherein the entire and partial brightness changing amounts are acquired by a difference between photographed image data obtained in different illuminating states;

photographed body collation processing for collating whether it is the photographed body already registered with respect to at least one photographing image or not; and authentication processing for authenticating that the photographed body is true when it is judged by said solid judgment processing that the photographed body collation processing that it is the photographed body already registered.

6. A photographed body authenticating method for authenticating a photographed body based on a photographic image provided by photographing the photographed body by photographing means;

wherein illuminating states using illuminating means are differently set, and a plurality of photographings are executed by photographing means;

whether the photographed body is solid or not is judged based on an entire brightness changing amount of an entirety of the photographed body and a partial brightness changing amount of a part of the photographed body, wherein the entire and the partial brightness changing amounts are acquired by a difference between photographed image data obtained in different illuminating states;

it is collated by photographed body collation processing whether it is the photographed body already registered with respect to at least one photographic image or not; and it is authenticated that the photographed body is true when it is judged by said solid judgment processing that the photographed body is solid, and it is judged by said photographed body collation processing that it is the photographed body already registered.

7. A computer-readable medium comprising a photographed body authenticating program for executing:

solid judgment processing for judging whether a photographed body is solid or not based on an entire brightness changing amount of an entirety of the photographed body and a partial brightness changing amount of a part of the photographed body, wherein the entire and the partial brightness changing amounts are acquired by a difference between photographed image data obtained in different illuminating states;

photographed body collation processing for collating whether it is the photographed body already registered with respect to at least one photographic image or not; and authentication processing for authenticating that the photographed body is true when it is judged by said solid judgment processing that the photographed body is solid, and it is judged by said photographed body collation processing that it is the photographed body already registered.

* * * * *